UNITED STATES PATENT OFFICE.

JOHN GAMGEE, OF LONDON, ENGLAND.

IMPROVEMENT IN DISINFECTING COMPOUNDS.

Specification forming part of Letters Patent No. 133,430, dated November 26, 1872.

*To all whom it may concern:*

Be it known that I, JOHN GAMGEE, of No. 1 Great Winchester Street Buildings, in the city of London and Kingdom of Great Britain, have invented certain "Improvements in the Manufacture of Chloralum and Chloralum Powder," of which the following is a specification:

My invention consists, for the manufacture of the antiseptic or disinfectant known as chloralum, in mixing together, in suitable proportions and in any convenient manner, chloride of calcium and sulphate of alumina, for the purpose of obtaining a hydrated chloride of aluminium, which I find is a very powerful and effective antiseptic, disinfectant, or deodorizer.

For the manufacture of the above-described compound into what I call chloralum powder, I grind together the dried chloride of calcium and the sulphate of alumina, to which from fifty to seventy-five per cent. of silica or of sulphate of lime is added as a basis, the result being a powder suitable for use in the same manner as other deodorizing powder.

I claim—

1. The manufacture of chloralum or chloride of aluminium by the mixture of chloride of calcium with sulphate of alumina, substantially as herein set forth.

2. The manufacture of what I call chloralum powder by grinding together chloride of calcium and sulphate of alumina, to which silica or sulphate of lime has been added, substantially as herein set forth.

JOHN GAMGEE.

Witnesses:
H. C. DAVEY,
    139 *Cannon Street, London, E. C.*
F. FINCH,
    139 *Cannon Street, London, E. C.*